United States Patent
Taniguchi et al.

(10) Patent No.: US 7,598,704 B2
(45) Date of Patent: Oct. 6, 2009

(54) PRINT SYSTEM AND PRINT TERMINAL, AND IMAGE SAVING SYSTEM AND IMAGE SAVING UNIT

(75) Inventors: Toshio Taniguchi, Asaka (JP); Toshio Matsubara, Asaka (JP)

(73) Assignee: Fujifilm Corporation, Tokyo (JP)

( * ) Notice: Subject to any disclaimer, the term of this patent is extended or adjusted under 35 U.S.C. 154(b) by 400 days.

(21) Appl. No.: 11/333,305

(22) Filed: Jan. 18, 2006

(65) Prior Publication Data

US 2006/0158152 A1 Jul. 20, 2006

(30) Foreign Application Priority Data

Jan. 19, 2005 (JP) .............................. 2005-011810

(51) Int. Cl.
*H02J 7/00* (2006.01)
(52) U.S. Cl. ...................................... 320/108
(58) Field of Classification Search ................ 320/108
See application file for complete search history.

(56) References Cited

U.S. PATENT DOCUMENTS

| | | | |
|---|---|---|---|
| 6,771,896 B2 * | 8/2004 | Tamura et al. ............... | 396/57 |
| 7,076,375 B2 * | 7/2006 | Raichle et al. ............... | 702/63 |
| 7,271,569 B2 * | 9/2007 | Oglesbee ..................... | 320/108 |
| 2004/0259499 A1 | 12/2004 | Oba et al. | |
| 2005/0025117 A1 | 2/2005 | Inagaki et al. | |

FOREIGN PATENT DOCUMENTS

| | | |
|---|---|---|
| JP | 2001-307032 A | 11/2001 |
| JP | 2003-32175 A | 1/2003 |
| JP | 2003-32176 A | 1/2003 |
| JP | 2003-32261 A | 1/2003 |

* cited by examiner

*Primary Examiner*—Akm E Ullah
*Assistant Examiner*—Jue Zhang
(74) *Attorney, Agent, or Firm*—Birch, Stewart, Kolasch & Birch, LLP (57) ABSTRACT

As the present invention is adapted to receive an image to be printed or to be saved from a portable device having the image by wireless communication, an image needs not to be passed via a memory card or by connector connection or the like. As the present invention is also adapted to automatically identify the other party's device to wirelessly communicate with and establish a channel, and further adapted to supply power to the other party's device without contact, it is advantageous that a battery of the portable device is not exhausted or the portable device is not disconnected even if the device communicates wirelessly for a long time.

10 Claims, 5 Drawing Sheets

PRINT SYSTEM AND PRINT TERMINAL, AND IMAGE SAVING SYSTEM AND IMAGE SAVING UNIT

BACKGROUND OF THE INVENTION

1. Field of the Invention

The present invention relates to a print system and a print terminal, and an image saving system and an image saving unit, more specifically to a technique for receiving an image from a portable device having the image by wireless communication and printing or saving the received image.

2. Description of the Related Art

When a person wants to print an image taken by a digital camera, a camera cellular phone or the like by a print terminal placed at a store or the like, the person conventionally would take a memory card out from the digital camera or the camera cellular phone, insert the memory card into a corresponding card slot of a memory card reader/writer of the print terminal and have the print terminal read an image in the memory card.

A wide variety of memory cards can be used for a digital camera or the like, such as a smart media, an xD picture card, a compact flash, an SD card, a memory stick, an ATA PC card, a floppy disk and the like. The print terminal has a memory card reader/writer with card slots corresponding to respective types of memory card.

Thus, when a new standard appears for a memory card, the print terminal with no card slot for the new standard cannot use the memory card complying with the new standard. In addition, a user may be confused about which card slot the user should insert his memory card, or may insert his memory card into a wrong card slot. Further, a user cannot use a print terminal to print an image if the image is stored in a device, which stores images in a built-in memory, such as a cellular phone or the like.

Therefore, a print terminal with a function of wirelessly receiving an image from a digital camera or the like for solving the above-mentioned problems is considered.

If plural terminals that can communicate with a print terminal with a wireless communication function are in a communication area of the print terminal, however, the print terminal may communicate with terminals other than the terminal which is going to order a print. If the print terminal starts communication after identifying the terminal to be communicated, both the print terminal and the terminal need to perform operation for inputting connecting information for identifying the each other, which is troublesome.

In view of the problems, each of Japanese Patent Application Laid-Open No. 2003-32175, Japanese Patent Application Laid-Open No. 2003-32176, and Japanese Patent Application Laid-Open No. 2003-32261 discloses a communication system in a ubiquitous network consisting of an information processing unit (personal computer) and a plurality of communication terminals (cellular phones), wherein each of the cellular phone has a built-in non-contact IC card for easily identifying the other party; and wherein the personal computer reads identifying information of the cellular phone registered on the non-contact IC card without contact; and wherein the system establishes a channel between the personal computer and the cellular phone based on the identifying information.

FIG. 9 of Japanese Patent Application Laid-Open No. 2001-307032 discloses a portable terminal for reading electronic information written in a non-contact IC card or a non-contact IC tag via a RFID reader/writer section without contact. The portable terminal includes a battery charger for charging a charging battery in the terminal by electromagnetic induction, and a wireless communication unit for sending information in memory to an external appliance by wireless communication via an electronic wave. The invention according to Japanese Patent Application Laid-Open No. 2001-307032 is characterized in that an antenna coil in the RFID reader/writer section, a coil of the battery charger (secondary coil) and an antenna of the wireless communication unit are shared.

SUMMARY OF THE INVENTION

Although each of Patent Japanese Patent Application Laid-Open No. 2003-32175, Japanese Patent Application Laid-Open No. 2003-32176, and Japanese Patent Application Laid-Open No. 2003-32261 discloses a technique for reading information registered on a non-contact IC card provided in a cellular phone (such as a Bluetooth device name or a Bluetooth address) at a personal computer side and establishing a channel between the personal computer and the cellular phone, each document does not mention communicated contents or printing of an image after the channel is established. With the communication systems particularly according to Patent Japanese Patent Application Laid-Open No. 2003-32175, Japanese Patent Application Laid-Open No. 2003-32176, and Japanese Patent Application Laid-Open No. 2003-32261, a battery of a cellular phone may be exhausted during communication and the communication may be disconnected.

Although a portable terminal according to Japanese Patent Application Laid-Open No. 2001-307032 has three functions as an RFID reader/writer section, a battery charger for charging a charging battery by electromagnetic induction, and a wireless communication unit, the functions operate independently and have no association with each other. In other words, the RFID reader/writer section is for reading/writing necessary information as an ID card or an electronic money from a non-contact IC card or a non-contact IC tag and not for reading connecting information of the other party of wireless communication as described in Patent Japanese Patent Application Laid-Open No. 2003-32175, Japanese Patent Application Laid-Open No. 2003-32176, and Japanese Patent Application Laid-Open No. 2003-32261. The battery charger of the portable terminal is for charging an internal charging battery by a dielectric electromotive force supplied from an external power supplying unit for charging and not for charging the other party.

The present invention is adapted in view of the circumstances and intends to provide a print system and a print terminal and an image saving system and an image saving unit for receiving an image to be printed or an image to be saved from a portable device having the image by wireless communication and especially for automatically identifying the other party's device to be wirelessly communicated and establishing a channel with the device, while preventing a battery of the portable device from being exhausted even if it communicates for a long time.

In order to achieve the above-mentioned object, a first aspect of the present invention provides a print system including portable device and a print terminal, wherein the portable device comprises a memory device for storing an image, a first wireless communication device for sending an image stored in the memory device to the print terminal by wireless communication, a first charging device having a secondary coil and for charging a charging battery in the portable device by a dielectric electromotive force generated at the secondary coil, and a connecting information communicating device for communicating connecting information for sending the image stored in the memory device to the print terminal by establishing wireless connection with the portable device and the print terminal, and wherein the print terminal comprises a charging table on which the portable device is placed, a second charging device having a primary coil and for generating a dielectric electromotive force to the secondary coil of the portable device placed on the charging table from the primary coil, a connecting information reading device for reading connecting information of the portable device from the connecting information communicating device of the portable device placed on the charging table, a second wireless communication device for establishing a wireless connection with the first wireless communication device of the portable device placed on the charging table based on connecting information read by the connecting information reading device and receiving an image stored in the memory device of the portable device by wireless communication, and a print device for printing the image received by the second wireless communication device.

In other words, the print terminal can automatically establish a channel between the first and the second wireless communication devices based on connecting information by reading the connecting information of the portable device from the connecting information communicating device provided in a portable device placed on the charging table. As the print terminal is adapted to supply electricity necessary for wireless communication at least with the portable device (in other words, adapted to charge a charging battery by generating a dielectric electromotive force to the secondary coil of the portable device), the charging battery of the cellular phone is not exhausted even if it is used for wireless communication for a long time, and the wireless communication is not disconnected during the communication.

A second aspect of the present invention provides the print system according to the first aspect, further comprising a charge control device for determining whether the portable device can be charged without contact or not based on connecting information read by the connecting information reading device, and if the portable device is determined as chargeable, causing the second charging device to operate. In this manner, the present invention can prevent an unregistered device, metal or the like other than objective device from performing charging operation by electromagnetic induction to guarantee charging safety.

A third aspect of the present invention provides the print system according to the first or the second aspect, wherein the connecting information communicating device is a non-contact IC tag for sending the connecting information, and wherein the connecting information reading device is a non-contact IC tag reading device for reading the connecting information from the non-contact IC tag provided in the portable device placed on the charging table without contact.

A fourth aspect of the present invention provides the print system according to the first or the second aspect, wherein the connecting information communicating device is a barcode provided on the surface of the portable device and recording the connecting information, and wherein the connecting information reading device is a barcode reading device for reading the barcode provided on the surface of the portable device placed on the charging table.

A fifth aspect of the present invention provides the print system according to any of the first aspect to the fourth aspect, wherein the print terminal further comprises a control device for controlling the second charging device and the second wireless communication device to alternate operation of charging a charging battery of the portable device and operation of receiving an image from the portable device. In other words, when wireless communication between the first wireless communication device and the second wireless communication device is communication via electronic wave, wireless interference may occur due to electromagnetic wave for generating an induced electromotive force from the primary coil of the second charging device of the print terminal to the secondary coil of the portable device, though, the present invention prevents the wireless interference caused by charging operation by alternating the charging operation and the communicating operation.

A sixth aspect of the present invention provides a print terminal for forming a print system according to any of the first aspect to the fifth aspect.

A seventh aspect of the present invention provides an image saving system including any portable device and an image saving unit, wherein the portable device comprises a memory device for storing an image, a first wireless communication device for sending the image stored in the memory device to the image saving unit by wireless communication, a first charging device having a secondary coil and for charging a charging battery in the portable device by a dielectric electromotive force generated at the secondary coil, and a connecting information communicating device for communicating connecting information for sending the image stored in the memory device to the print terminal by establishing wireless connection with the portable device and the image saving unit, and wherein the image saving unit comprises a charging table on which the portable device is placed, a second charging device having a primary coil and for generating a dielectric electromotive force to the secondary coil of the portable device placed on the charging table from the primary coil, a connecting information reading device for reading connecting information of the portable device from the connecting information communicating device of the portable device placed on the charging table, a second wireless communication device for establishing a wireless connection with the first wireless communication device of the portable device placed on the charging table based on connecting information read by the connecting information reading device and receiving an image stored in the memory device of the portable device by wireless communication, and an image saving unit for saving an image received by the second wireless communication device.

In other words, the invention according to the first aspect is a print system for printing an image received from a portable terminal, while the invention according to the seventh aspect is an image saving system for saving an image received from a portable terminal in an image saving unit, whose functions of automatically connecting wirelessly or charging by electromagnetic induction are the same as those of the invention according to the second aspect.

An eighth aspect of the present invention provides the image saving system according to the seventh aspect, further comprising a charge control device for determining whether the portable device is chargeable without contact or not based on connecting information read by the connecting information reading device, and if the portable device is determined as chargeable, causing the second charging device to operate.

A ninth aspect of the present invention provides the image saving system according to the seventh aspect or the eighth aspect, wherein the connecting information communicating device is a non-contact IC tag for sending the connecting information, and wherein the connecting information reading device is a non-contact IC tag reading device for reading the connecting information without contact from the non-contact IC tag provided on the portable device placed on the charging table.

A tenth aspect of the present invention provides the image saving system according to the seventh aspect or the eighth aspect, wherein the connecting information communicating device is a barcode provided on the surface of the portable device and recording the connecting information, and wherein the connecting information reading device is a barcode reading device for reading the barcode provided on the surface of the portable device placed on the charging table.

An eleventh aspect of the present invention provides the image saving system according to any of the seventh aspect to the tenth aspect, wherein the image saving unit further comprises a control device for controlling the second charging device and the second wireless communication device to alternate operation of charging a charging battery of the portable device and operation of receiving an image from the portable device.

A twelfth aspect of the present invention provides an image saving unit for forming an image saving system according to any of the seventh aspect to the eleventh aspect.

As the present invention is adapted to receive an image to be printed or to be saved from a portable device having the image by wireless communication, an image needs not to be passed via a memory card or by connector connection or the like. As the present invention is also adapted to automatically identify the other party's device to wirelessly communicate with and establish a channel, and further adapted to supply power to the other party's device without contact, it is advantageous that a battery of the portable device is not exhausted or the portable device is not disconnected even if the device communicates wirelessly for a long time.

DETAILED DESCRIPTION OF THE PREFERRED EMBODIMENTS

Preferable embodiments of the print system and the print terminal and the image saving system and the image saving unit according to the present invention will be described in detail with reference to the attached drawings.

Figure 1:
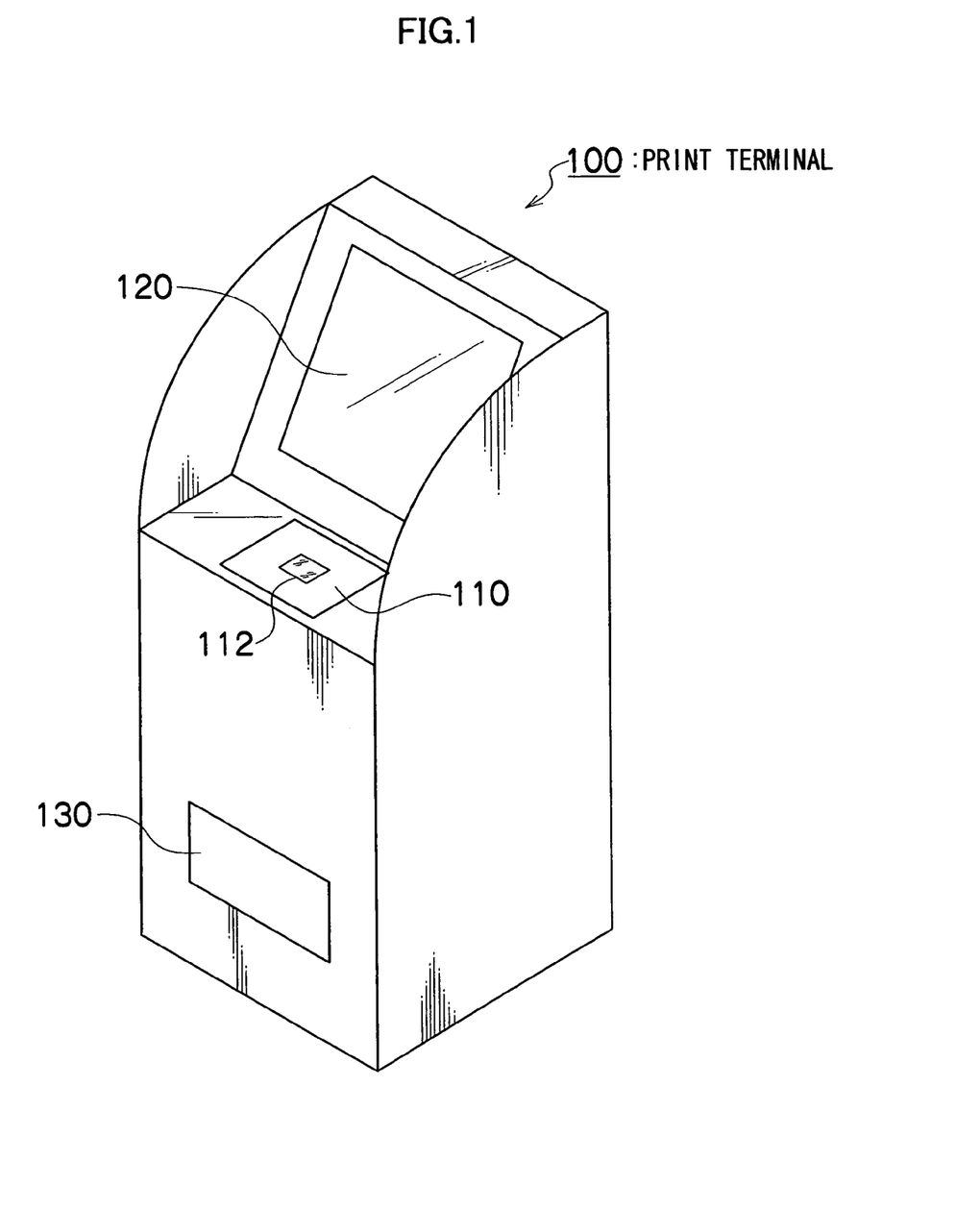
FIG. 1 is an outside view showing an embodiment of a print terminal according to the present invention.

FIG. 1 is an outside view showing an embodiment of a print terminal according to the present invention.

The print terminal 100 is placed at a store for receiving an image from any user's portable device (for example, a portable device having an image such as a digital camera, a cellular phone, a personal digital assistance (PDA), a mobile personal computer, a photo-player and a handy terminal) by wireless communication and printing the received image. The print terminal 100 has a charging table 110, on which a portable device is placed, a monitor 120 with a touch panel, a print slot 130, a coin machine (not shown) and the like.

<Print System>

Figure 2:
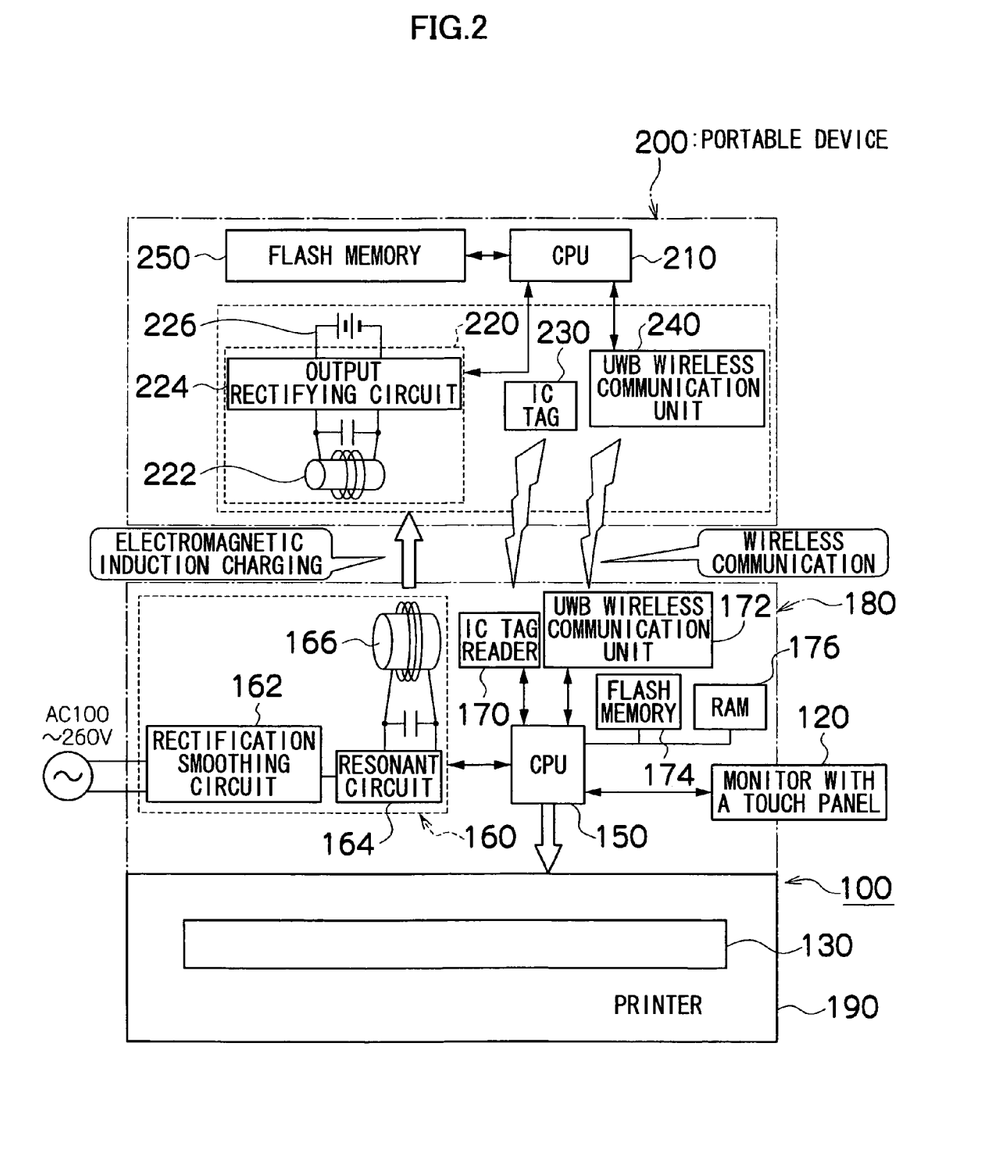
FIG. 2 is a block diagram showing an embodiment of a print system according to the present invention.

FIG. 2 is a block diagram showing an embodiment of a print system according to the present invention. The print system includes a print terminal 100 and any portable device 200.

[Print Terminal]

As shown in FIG. 2, the print terminal 100 mainly includes an image obtaining section 180 including the monitor 120 with a touch panel, a central processing unit (CPU) 150 for controlling over the print terminal, a battery charger 160, an IC tag reader 170, a UWB (Ultra Wide Band) wireless communication unit 172, flash memory 174, RAM (Random Access Memory) 176; and a printer 190 as shown in FIG. 1.

The battery charger 160 includes a rectification smoothing circuit 162, a resonant circuit 164 and a primary coil 166. To the rectification smoothing circuit 162, AC power is supplied from an alternator. The rectification smoothing circuit 162 rectifies and smoothes AC power to be inputted and outputs direct-current electricity in a predetermined voltage to the resonant circuit 164. The resonant circuit 164 excites the primary coil 166 by using direct-current electricity to input as a power source in frequency of 10 KHz to 100 KHz and generates an electromagnetic wave for electromagnetic inductive charging from the primary coil 166. The primary coil 166 is laid in the charging table 110 shown in FIG. 1. Therefore, the battery charger 160 on the print terminal side can charge the portable device 200 placed on the charging table 110 by electromagnetic induction. The battery charger 160 is controlled by the CPU 150. The controlling of the battery charger 160 will be detailed later.

An antenna coil (not shown) of the IC tag reader 170 is laid on the charging table 110 and the IC tag reader 170 supplies power to a non-contact IC tag provided for the portable device 200 via the antenna coil, and reads information on the portable device 200 from the IC tag 230 and outputs the read information to the CPU 150.

The UWB wireless communication unit 172 is for receiving an image from the portable device 200 by wirelessly communicating with a UWB wireless communication unit 240 on the portable device side. The UWB wireless communication unit 172 sends/receives data by diffusing the data across a wide frequency band for performing large capacity of data communication in the close range communication.

The flash memory 174 stores programs for operating the CPU 150, information on the other party, and the like. The RAM 176 provides a working area for the CPU 150 to execute process or storage area for temporally storing a received image.

The monitor with a touch panel 120 displays an image read from the portable device 200, buttons for a user to operate the touch panel (operation section) and information on a print order. The touch panel of the monitor 120 with a touch panel can be used to select an image to print, set the number of print (one for default) and indicate printing.

The printer 190 is connected with the image obtaining section 180 with the above configuration via the SCSI connection or the USB connection. The printer 190 receives a print image from the image obtaining section 180 and prints the print image on a sheet of photographic paper. The photograph print made by the printer 190 is discharged into the print slot 130.

[Portable Device]

Now, the portable device 200 will be described.

The portable device 200 is a portable device having an image from a digital camera, a cellular phone or the like as mentioned above. The portable device 200 mainly includes a CPU 210 for controlling over the portable device, a battery charger 220, a non-contact IC tag 230, a UWB wireless communication unit 240 and flash memory 250. FIG. 2 only shows a main part of the portable device 200 which is applied to the print system according to the present invention.

The portable device 200 uses a charging battery 226 as a power source. The battery charger 220 has a secondary coil 222 and an output rectifying circuit 224 and charges a charging battery 226 by electromagnetic induction. In other words, a dielectric electromotive force is generated by electromagnetic wave generated from the primary coil 166 of the battery charger 160 on the print terminal side at the secondary coil 222. The dielectric electromotive force is rectified by the output rectifying circuit 224 and outputted to the charging battery 226. The charging battery 226 is charged by charging current applied from the output rectifying circuit 224. The CPU 210 monitors charging status of the charging battery 226. When the charging battery 226 is charged, the CPU 210 controls to stop the charging or the like.

The IC tag 230 stores unique connecting information for establishing connection for wirelessly communicating with the print terminal 100, such as a device name, a manufacturer, a serial number and the like of the portable device 200 in advance. The connecting information stored in the IC tag 230 is read by the IC tag reader 170 on the print terminal side.

The flash memory 250 is a memory card detachable to the portable device 200 or built-in memory of the device. The flash memory 250 records an image. When wireless connection between the UWB wireless communication unit 172 on the print terminal side and the UWB wireless communication unit 240 on the portable device side is established, the image recorded in the flash memory 250 is sent via the UWB wireless communication unit 240 in response to a request of the print terminal side for sending an image.

[Operation]

Now, operation of the print system according to the present invention will be described.

Figure 3:
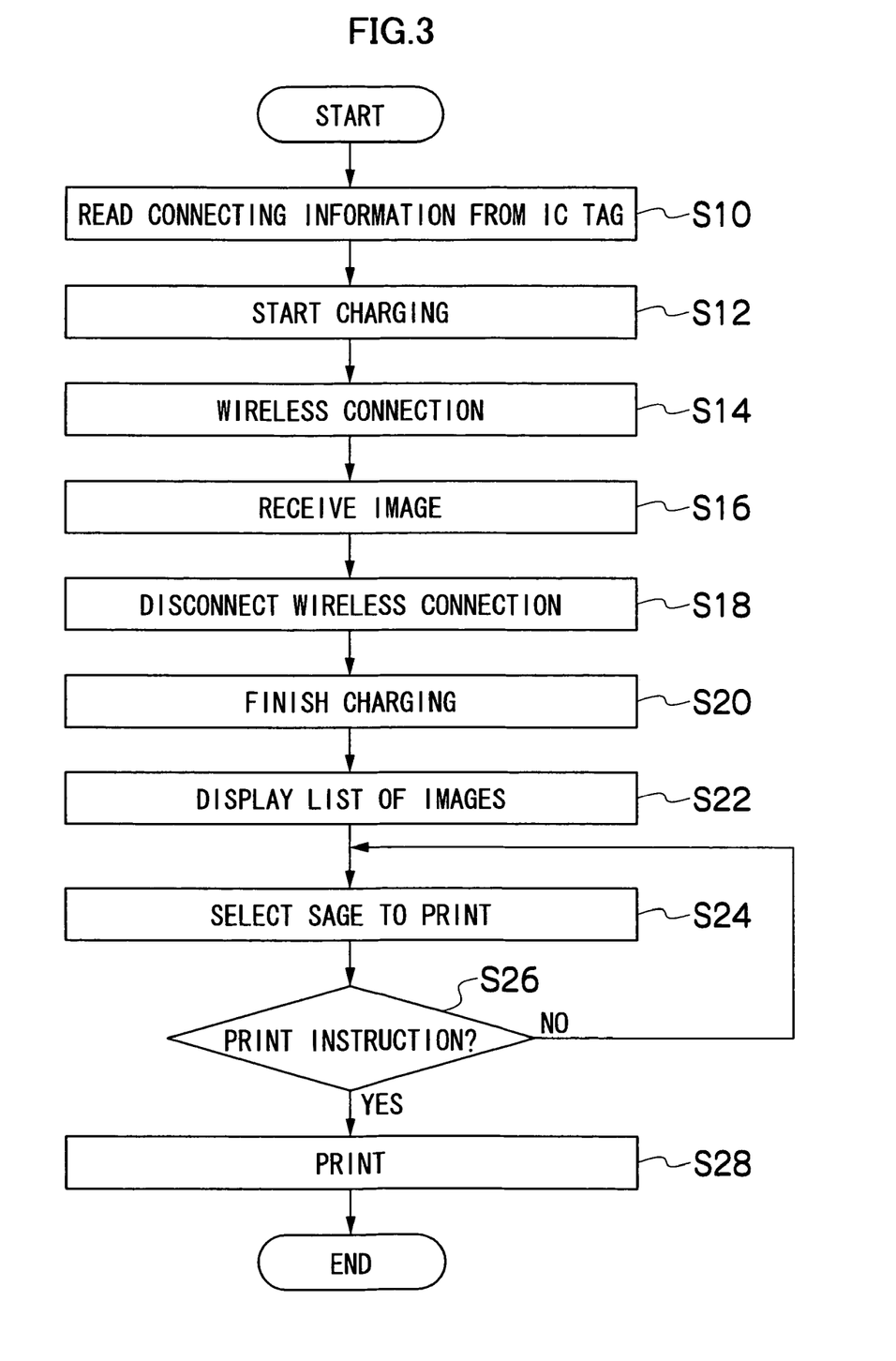
FIG. 3 is a flowchart for showing a flow of process by the print terminal.

FIG. 3 is a flowchart for showing a flow of process by the print terminal 100.

When the portable device 200 is placed on the charging table 110, the print terminal 100 reads connecting information such as a device name, serial number and the like from the IC tag 230 provided for the portable device 200 by the IC tag reader 170 without contact. The IC tag reader 170 outputs the read connecting information to the CPU 150 (step S10). A tag reader, which communicates for a communication distance only for communicating with (read from) the portable device placed on the charging table 110 and not with the other portable device, is applied for the IC tag reader 170.

When the connecting information is inputted from the IC tag reader 170, the CPU 150 determines whether the portable device can be charged without contact or not based on the connecting information, and if the portable device is the previously registered object device, the CPU 150 instructs the battery charger 160 to start charging (step S12). If the portable device is what not registered as an object, such as a non-registered device or metal material, the CPU 150 does not instruct the battery charger 160 to charge due to risk of malfunction, breakdown, heating or the like.

The battery charger 160, to which an instruction to start charging is inputted, generates an electromagnetic wave from the primary coil 166. This electromagnetic wave causes the secondary coil 222 of the battery charger 220 in the portable device 200 to generate a dielectric electromotive force, which charges the charging battery 226.

The CPU 150 instructs the battery charger 160 to start charging and also operates the UWB wireless communication unit 172 to wirelessly connect with a particular portable device 200 (step S14). In other words, the UWB wireless communication unit 172 of the print terminal 100 searches for the other party. A communication distance of the UWB wireless communication unit is about 10 m. The UWB wireless communication unit requests connecting information such as a device name, a serial number and the like from the devices within the communication range, receives connecting information and outputs the connecting information to the CPU 150. The CPU 150 compares the connecting information inputted from the IC tag reader 170 with the connecting information inputted from the UWB wireless communication unit 172. The CPU 150 identifies the portable device 200 that sent the matched information as the other party and establishes a channel between them.

When a UWB wireless communication is established between the print terminal 100 and the portable device 200, the CPU 150 requests to send an image, receives an image saved in the flash memory 250 in the portable device 200 by the UWB wireless communication and temporally stores the received image in the RAM 176 in the print terminal 100 (step S16).

When all the images in the portable device 200 have been received, the CPU 150 disconnects the UWB wireless connection, and also instructs the battery charger 160 to finish the charging and finishes charging of the portable device 200 (steps S18, S20). While images are received in this manner, the portable device 200 is charged from the print terminal 100 without contact. Thus, disconnection due to exhaustion of the charging battery 226 of the portable device 200 does not occur even if the communication is performed for a long time.

When the images have been received, the CPU 150 displays a list of images temporally stored in the RAM 176 on the monitor 120 with a touch panel (step S22). The user operates the touch panel to select an image to print, the number of print, print size, and the like by viewing the monitor 200 (step S24). When the print "OK" button is touched and a printing instruction is inputted (step S26), the CPU 150 generates an image for printing from an image selected for printing and outputs the image to the printer 190. The printer 190 prints the image on a sheet of photographic paper based on an image for printing to be inputted and discharges the printed photograph print into the print slot 130 (step S28). When an instruction for printing is inputted, a coin machine (not shown) performs billing for the print. Then, operation proceeds to print operation.

Although the IC tag reader 170 of the print terminal 100 reads connecting information from the non-contact IC tag 230 provided for the portable device 200 in the embodiment, the present invention is not limited to this and may be adapted to provide a barcode reader for the print terminal 100 and read connecting information from a barcode (one-dimensional barcode or two-dimensional barcode) attached to a package of a portable device.

That is to say, the present invention may provide a barcode reading window 112 on the charging table 110 so that a user can place a portable device on the charging table 110 to have a barcode on the portable device face to the barcode reading window 112 as shown in FIG. 1. The present invention may also provide a barcode reader inside the barcode reading window 112 to read a barcode (connecting information) of a portable device placed on the charging table 110.

As charging of the portable device 200 by the electromagnetic induction is performed at the same time as the UWB wireless communication performed for receiving an image from the portable device 200 in the embodiment, wireless interference due to an electromagnetic wave may occur during the charging operation.

Figure 4:
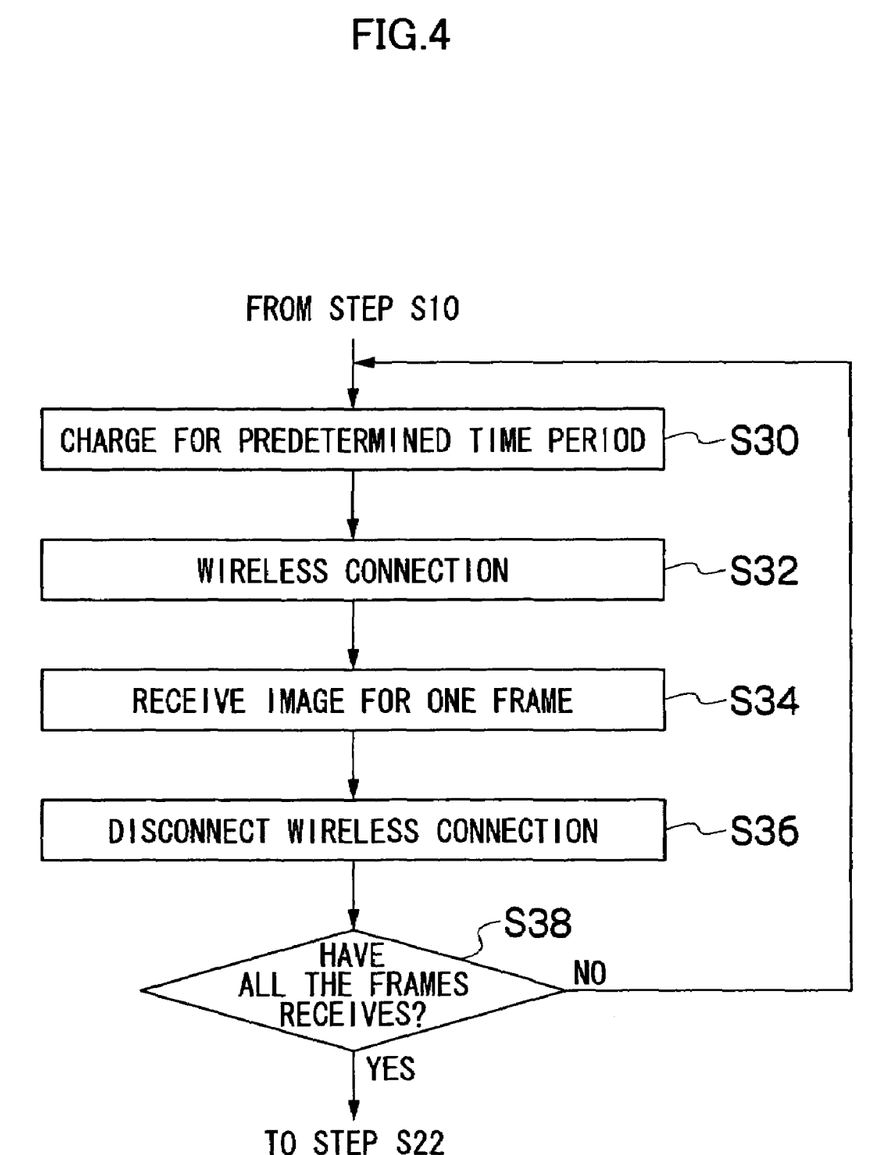
FIG. 4 is a flowchart for showing an example of other process of some steps in the flowchart shown in FIG. 3.

FIG. 4 is a flowchart for showing an example of other process between step S10 and step S22 in the flowchart shown in FIG. 3. The flowchart shown in FIG. 4 shows a flow of process for avoiding the above-mentioned wireless interference.

That is to say, when the portable device 200 of the other party is identified, the CPU 150 operates the battery charger 160 for a predetermined time period to charge the charging battery 226 of the portable device 200 by electromagnetic induction for the predetermined time period. After charging for the predetermined time period, the CPU 150 stops charging by the battery charger 160 to prevent the primary coil 166 of the battery charger 160 from generating an electromagnetic wave (step S30).

Then, the CPU 150 operates the UWB wireless communication unit 172 to wirelessly connect with the portable device 200 (step S32), requests to send an image for a frame, and receives an image for a frame of images stored in the flash memory 250 in the portable device 200 by the UWB wireless communication (step S34). After receiving the image for a frame, the CPU 150 disconnects the UWB wireless connection (step S36).

Then, the CPU 150 determines whether all the frames have been received or not (step S38). If all the frames have not been received yet, operation returns to step S30 and charging operation of the charging battery 226 and receiving operation of an image for a frame are repeated. If all the frames have been received, operation proceeds to step S22 shown in FIG. 3. The CPU 150 obtains the number of all the images and the image file names for all the images and the like recorded in the portable device 200 at the first communication to determine whether or not all the frames have been received later.

The CPU 150 alternates the charging operation of the charging battery 226 of the portable device 200 and the receiving operation of images from the portable device 200 to prevent wireless interference.

Charging time at step S30 is decided so that the charging battery 226 of the portable device 200 is charged with power more than that consumed in sending an image for a frame. Although wireless connection and disconnection of the wireless connection are repeated in the embodiment shown in FIG. 4, the wireless connection may be kept through with avoiding wireless communication during periodical charging periods.

When the charging operation and the operation of receiving an image are alternated, not only one frame is processed but also the charging operation and the receiving operation may be alternated for data of a predetermined number of packets. In such a case, charging time is decided so that the charging battery 226 of the portable device 200 can be charged with power more than that consumed in sending data of a predetermined number of packets.

In order to save traffic, the present invention may be adapted to receive only reduced images (thumbnail images) for all the frames at first, and when a print image is selected based on the thumbnail images, request to send the main image of the selected print image and receive only the image used for printing.

Although the print terminal 100 for business use is described in the embodiment, the embodiment can be applied to a print terminal for home use. Especially, the print terminal for home use may be function as a battery charger for charging a portable device to full without contact after printing or without printing operation. The present invention can detect the completion of charging and the charging capacity of the charging battery 226 by monitoring the UWB wireless communication device or monitoring the charging current. The present invention can control battery charger of the print terminal based on the monitored result.

The wireless communication devices of the print terminal and the portable device are not limited to UWB wireless communication units, and may be a wireless communication unit of the Bluetooth standard, an infra-red wireless communication unit of the IrDA standard or the other wireless LAN communication devices. As an infra-red wireless communication unit does not cause wireless interference, charging operation by electromagnetic induction and wireless communication can be performed at the same time.

<Image Saving System>

Figure 5:
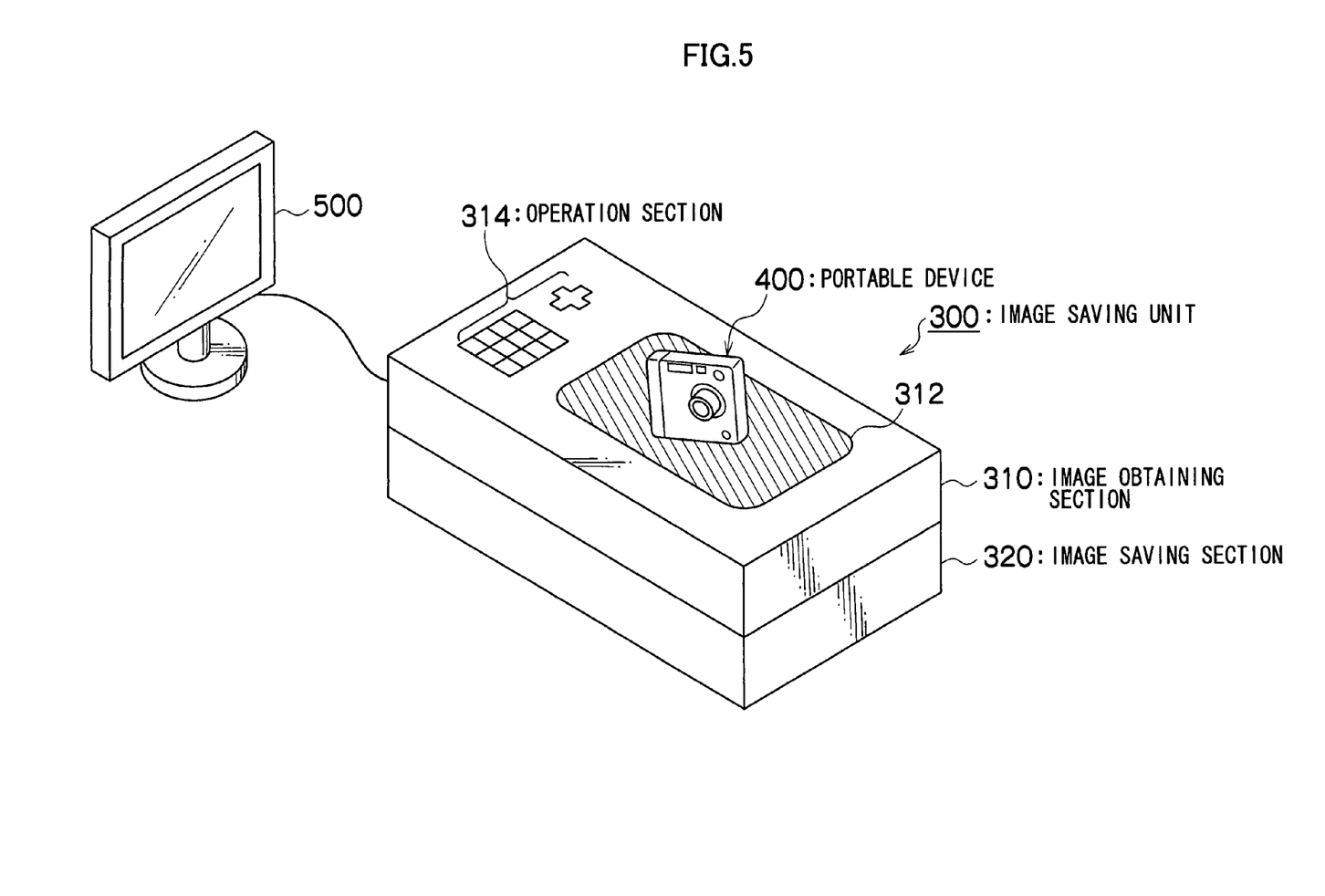
FIG. 5 is an outside view showing an embodiment of an image saving system according to the present invention.

FIG. 5 is an outside view showing an embodiment of an image saving system according to the present invention.

The image saving system includes an image saving unit 300 and a portable device 400.

The image saving unit 300 includes an image obtaining section 310 and an image saving section 320. The image obtaining section 310 has a charging table 312, on the top of which the portable device 400 is mounted, and an operation section 314 such as a numeric pad and directional keys. The image obtaining section 310 has similar configuration as that of the image obtaining section 180 of the print terminal 100 shown in FIG. 2.

The image saving section 320 includes a large capacity of hard disk unit and is connected with the image obtaining section 310 via the SCSI connection or the USB connection. The image saving section 320 saves the image (still image or moving image) obtained by the image obtaining section 310.

The image saving unit 300 includes an image outputting terminal for outputting an image saved in the image saving section 320 to an external monitor 500 and a print outputting terminal for outputting the image to a home printer (not shown).

The portable device 400 has the same configuration as that of the portable device 200 shown in FIG. 2. The portable device 400 shown in FIG. 5 is shown in the case of a digital camera.

[Operation]

Now, operation of the image saving system according to the present invention will be described.

When the portable device 400 is placed on the charging table 312 of the image obtaining section 310, an IC tag reader reads connecting information such as a device name and a serial number from the IC tag provided for the portable device 400 without contact.

When the portable device 400 is the previously registered object device based on the read connecting information, the image obtaining section 310 generates an electromagnetic wave from the charging table 312 to charge the charging battery in the portable device 400 by electromagnetic induction.

The image obtaining section 310 establishes a UWB wireless channel with the portable device 400 based on the read connecting information, and receives an image saved in the portable device 400 by the UWB wireless communication. During the wireless communication, the image saving unit 300 charges the portable device 400 continuously or periodically to prevent wireless interference due to an electromagnetic wave for charging.

The image received by the image obtaining section 310 from the portable device 400 in this manner is transferred and saved in the image saving section 320.

The image saving unit 300 enables a user to output an image saved in the image saving section 320 to the external monitor 500 via an image outputting terminal for viewing by operating the operation section 314 or enables a user to output the image to a home printer via a print outputting terminal for executing the printing. A user can also delete an unnecessary image from the image saving unit 300.

After the image saving unit 300 captured all the images from the portable device 400, the image saving unit 300 keeps charging by electromagnetic induction until the charging battery in the portable device 400 is charged to full.

The image saving unit 300 is preferably to have a function of managing header information such as a file name or date and time of taking the picture of an image saved in the image saving section 320 so as not to save the same image redundantly. In this manner, even if an image in the portable device 400 has not been deleted, the portable device 400 can be prevented from saving the same image each time it is charged.

What is claimed is:

1. A print system including a portable device and a print terminal, wherein the portable device comprises a memory device for storing an image, a first wireless communication device for sending an image stored in the memory device to the print terminal by wireless communication, a first charging device having a secondary coil and for charging a charging battery in the portable device by a dielectric electromotive force generated at the secondary coil, and a connecting information communicating device for communicating connecting information for sending the image stored in the memory device to the print terminal by establishing wireless connection with the portable device and the print terminal, and wherein the print terminal comprises a charging table on which the portable device is placed, a second charging device having a primary coil and for generating a dielectric electromotive force to the secondary coil of the portable device placed on the charging table from the primary coil, a connecting information reading device for reading connecting information of the portable device from the connecting information communicating device of the portable device placed on the charging table, a second wireless communication device for establishing a wireless connection with the first wireless communication device of the portable device placed on the charging table based on connecting information read by the connecting information reading device and receiving an image stored in the memory device of the portable device by wireless communication, and a print device for printing the image received by the second wireless communication device;

wherein the print terminal further comprises a control device for controlling the second charging device and the second wireless communication device to alternate operation of charging a charging battery of the portable device and operation of receiving an image from the portable device to prevent wireless interference.

2. The print system according to claim 1, further comprising:
   a charge control device for determining whether the portable device can be charged without contact or not based on connecting information read by the connecting information reading device, and if the portable device is determined as chargeable, causing the second charging device to operate.

3. The print system according to claim 1, wherein the connecting information communicating device is a non-contact IC tag for sending the connecting information, and wherein the connecting information reading device is a non-contact IC tag reading device for reading the connecting information from the non-contact IC tag provided in the portable device placed on the charging table without contact.

4. The print system according to claim 2, wherein the connecting information communicating device is a non-contact IC tag for sending the connecting information, and wherein the connecting information reading device is a non-contact IC tag reading device for reading the connecting information from the non-contact IC tag provided in the portable device placed on the charging table without contact.

5. The print system according to claim 1, wherein the connecting information communicating device is a barcode provided on the surface of the portable device and recording the connecting information, and wherein the connecting information reading device is a barcode reading device for reading the barcode provided on the surface of the portable device placed on the charging table.

6. The print system according to claim 2, wherein the connecting information communicating device is a barcode provided on the surface of the portable device and recording the connecting information, and wherein the connecting information reading device is a barcode reading device for reading the barcode provided on the surface of the portable device placed on the charging table.

7. A print terminal for forming a print system according to claim 1.

8. A print terminal for forming a print system according to claim 4.

9. A print terminal for forming a print system according to claim 6.

10. The print system according to claim 1, wherein the print terminal further comprises a processor for determining whether a portable device placed on the charging table is a previously registered device.

* * * * *